Aug. 19, 1969   S. L. GRAHAM   3,462,753
LIQUID LEVEL INDICATOR
Filed Oct. 22, 1965
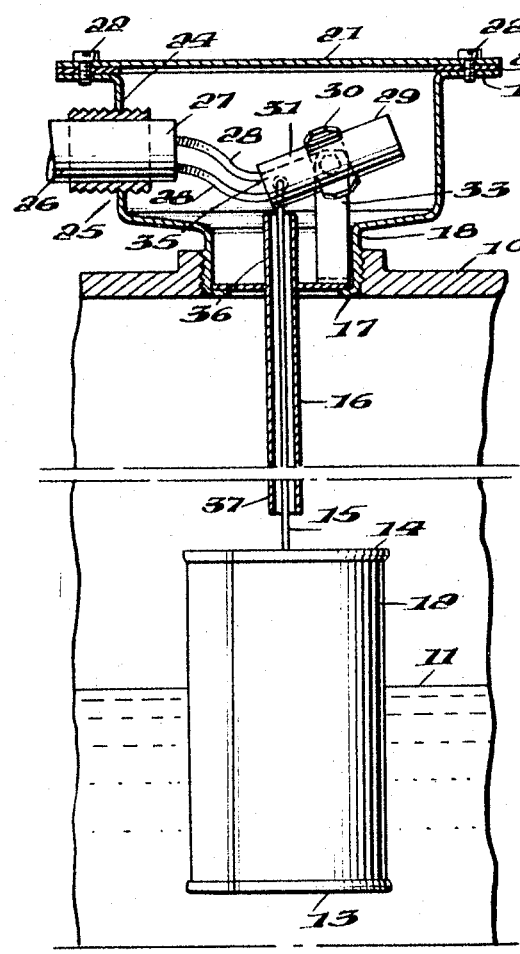
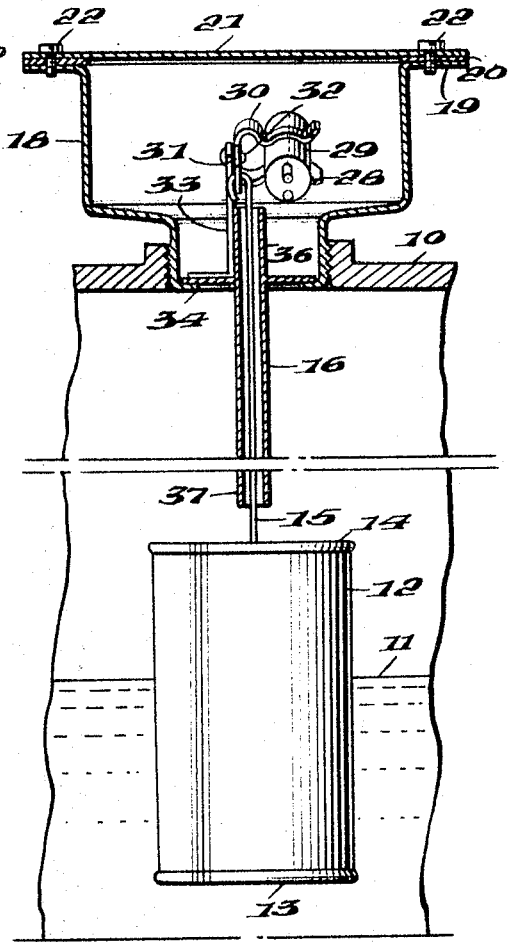
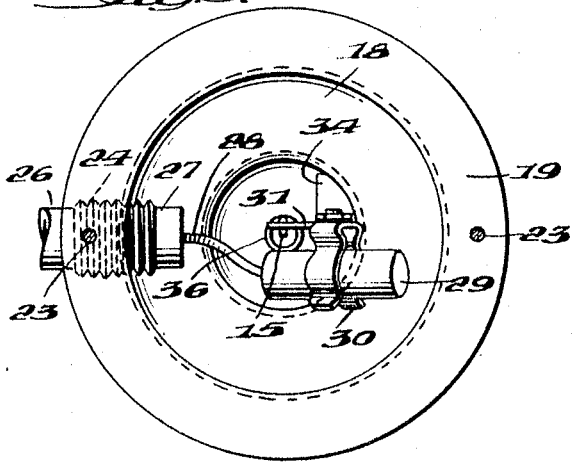
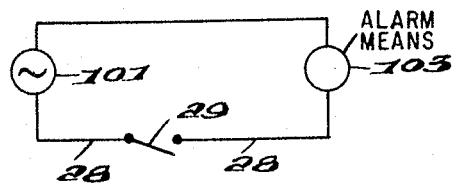
INVENTOR
SHIRLEY LEONARD GRAHAM,
BY Benjamin G. Weil
ATTORNEY 3,462,753
LIQUID LEVEL INDICATOR
Shirley Leonard Graham, 1105 Baltimore National Pike,
Ellicott City, Md. 21043
Filed Oct. 22, 1965, Ser. No. 501,693
Int. Cl. G08b 21/00, 23/00; H01h 35/18
U.S. Cl. 340—244                              2 Claims

ABSTRACT OF THE DISCLOSURE

A system for the indication of the level of a liquid in a tank employing a float actuating electrical switching means by mechanical linkage. The system includes a push rod of a flexible mechanical spring material, immovably attached to the float at one end which rotates under torsional loading by the buoyant thrust of the float, and rotates in the other direction when unloaded, so that binding in its guide is prevented.

---

This invention relates to electro-mechanical apparatus used to indicate the level of a liquid in a tank and more particularly to a float-type gauge system adapted to generate an electric signal to actuate an alarm warning that the level of the liquid in the tank has fallen below a predetermined level, which alarm will be inactivated upon replenishing the contents of the tank and remain inactive until the fluid level again falls below the predetermined minimum.

There have been numerous systems devised heretofore employing float actuated senders which generate a signal responsive to the level of the float to announce the fall of the liquid level in a tank below a predetermined minimum level. It is further recognized that employment of a float driven pushrod as a linear actuator to operate the sender is not in itself broadly new. However, no fully satisfactory push rod actuated system has been developed which employs a substantially vertical push rod. The present invention is designed to overcome the defects heretofore existing in such apparatus, thereby providing a cheap, simple, safe, reliable, and easily installed apparatus that will function satisfactorily through many repeated cycles of operation.

A most serious defect found in previous apparatus of this general character employing a substantially vertical push rod involves their failure to effectively utilize the buoyant force derived from a float in contact with a liquid to produce a reliable indication through repeated cycles of operation. The efficient operation of such devices has heretofore been affected by both dynamic and structural instability. Such instability has resulted in the production of frictional forces and component distortion which have caused such systems to be unreliable in operation and inaccurate in indication.

Commonly employed floats, particularly floats of the closed type, when attached to the end of a push rod do not generate in practice a buoyant force that is directly in line with the vertical axis of the push rod. They will wander off center, thereby producing displacement and elastic deformation of the push rod. Such effects are vary undesirable. Such displacement and bending of the push rod will cause it to bear against its guide or guides, thereby creating a frictional load that can cause it to bind or hang up in its guide means. After repeated cycling, a permanent set to the push rod can be expected, which will increase as the operative cycles increase, until eventually the push rod will become jammed in its guide means and the float will fail to descend as the liquid level recedes. It is, of course, structurally feasible to produce a push rod that will not bend as aforesaid. However, increased strength means increased weight requiring an unnaturally large float to support and move it. Such a large float will occupy a larger space within the tank, and this is undesirable as the tank is designed to contain fluids and not floats. In addition, such bending and deformation result in a loss of calibration of the system, as it will produce a signal at variance with that initially desired due to dimensional changes in the length of stroke of the push rod.

For such reasons, systems of this general type have in the past employed additional auxiliary cooperating structure to stabilize the float during its travel and confine its travel to an essentially linear direction. One such structure in common use is a float housing or tube affixed to the tank structure in which the float rises and falls in response to changes in liquid level. The internal geometry of this structure conforms closely to the external geometry of the float so as to limit its lateral movement and prevent it from wandering. Liquid is admitted to this housing through one or more ports communicating with the interior of the tank. Such an arrangement has significant disadvantages. While serving to minimize mechanical difficulties within the actuating mechanism itself, it results in the addition of a new frictional load factor due to the impingement of the float on the internal walls of the float housing, which must be closely fitted. Such impingement frequently results in the float binding on the internal walls of the housing, locking the float in a position so that it will not truly respond to the level of the liquid in the tank. In such case, the information desired with respect to the level of liquid in the tank is not generated by the system. Furthermore, this float housing must be installed at the time the tank is constructed or the tank must be opened up for its installation at a later time. Thus, a specially constructed or modified tank is needed. In addition, the float must be carefully fitted into the housing on installation of the device or else it or its associated structure may be damaged. To avoid the foregoing disadvantages, another expedient has been employed consisting of a damping mass dependent from the float. This mass usually takes the form of a chain attached to an anchor, which anchor may rest permanently on the bottom of the tank or be lifted off the bottom, as the case may be. Such systems result in increased weight to be lifted by the float, resulting in an undesirably larger float. They are also subject to the deficiency that they will not operate properly if the attachment of the mass to the float should fail or if the chain should become adherent to the bottom of the tank due to the accumulation of an adhesive sludge.

For these reasons, float actuated systems for this purpose in general use are constructed in a configuration wherein the rod connecting the float to the sending means is orientated substantially in the horizontal plane, as distinguished from the substantially vertical push rod employed in this invention. Such devices have the disadvantages of requiring an opening or openings in a side of the tank at approximately the level of the fluid at which an indication is desired. Such an opening or openings may be relatively small to connect the interior of the tank with an external float chamber in which the float rises and falls in response to liquid level in the tank. The usual installation involves the connection of the float chamber structure to the interior of the tank through two arms of piping, one being above the predetermined fluid level and one being below such level. Such a construction requires an expensive and complex seal to permit the mechanical motion of the float to be communicated to an external sender or to effectively physically isolate a position sensitive internal sender from the contents of the tank. As the liquid level will normally be substantially higher than the level of the sender, this seal, as well as the float chamber, must be heavily and strongly constructed to withstand the hydrostatic pressure within the tank. Also openings are not always permitted or desired in the side walls of tanks, particularly when flammable liquids are stored therein. Lastly, such a system is difficult to install in a tank which is already in use. Access must be gained to a side wall, which may not be easy if the tank is not free-standing and especially difficult if the tank is buried. Unless the tank is especially constructed to have openings at just the height desired, openings would have to be cut in the tank wall, which could require draining of the tank and purging it of vapors if flammables had previously been stored therein. A further disadvantage of this type of indicating apparatus is that the external plenum chamber is subject to deposition of sludge which will over a period of time accumulate to a point where it will prevent vertical movement of the float and thus generate a false read-out. For this reason drains or clean-out plates or both must be provided so that the accumulated sludge may be removed at fairly frequent intervals. This again results in the provision of additional structure with ensuing extra cost and requires periodical servicing operations which cannot be neglected if a reliable indication is needed.

This invention features a construction that is arranged with its elements arranged in an essentially in-line configuration to be substantially probe-like. This permits its adaptation to existing tanks by inserting it into the tank through its filling hole and eliminates the need for external hydraulic circuitry.

Accordingly, it is a principal object of the invention to provide an entirely reliable device, that will fail safe through the action of gravity, to transmit a signal to a remote location to actuate an alarm system if the fluid level therein falls below a predetermined level, and that will continue to perform this function through many cycles of operation over a long period of time without failure or error.

It is also a principal object of this invention to provide a float actuated liquid gauging apparatus employing a substantially vertical push rod driven by the float to activate a sender to transmit a signal responsive to the level of a liquid which is substantially free from frictional forces and structural deformation which would cause it to malfunction.

Furthermore, it is an object of this invention to provide a device in accordance with the preceding objects that is readily adaptable for existing tanks without change or alteration thereto, that does not require special cooperating structure either inside or outside the tank, and does not require structure that is required to withstand the hydrostatic pressure within the tank without leaking.

It is a further object of this invention to provide a device in accordance with the preceding objects that is economical to manufacture by eliminating expensive components such as flexible seals, float housings, float guides, auxiliary piping or specially constructed tanks and thereby providing an apparatus having a relatively small number of parts.

It is another object of this invention to provide a device in accordance with the preceding objects that is simple to install or remove as a complete unit without the need for special skills or tools.

It is still another object of this invention to provide a device in accordance with the preceding objects that is safe to use in the gauging of flammable liquids.

It is yet another object of this invention to provide a device in accordance with the preceding objects that employs an improved float structure that is relatively stable in equilibrium and not subject to water-logging or leakage.

It is again another object of this invention to provide a device in accordance with the preceding objects that requires a minimum of maintenance and is free from either error or failure due to the accumulation of sludge or sediment.

The above and other objects and advantages of the invention will become apparent upon a full consideration of the following detailed description and accompanying drawings in which:

FIGURE 1 is a side view of the system of the present invention having certain parts shown in section to facilitate the explanation thereof.

FIGURE 2 is a similar view of the system of the present invention taken along a line 2—2 of FIGURE 1.

FIGURE 3 is a top plan view of the apparatus illustrated in FIGURE 1 with the cover plate removed.

FIGURE 4 is a digrammatic view showing a normally open electric circuit in which the apparatus of the present invention may be used.

Referring to the drawings in detail, and with particular reference to FIGURE 1, at 10 is shown a tank containing a liquid indicated by numeral 11. The tank 10 is provided with a threaded aperture 17, which may be used as the filling aperture for the tank, but which is normally closed by a threaded removable cup-shaped plug 18 having screw threads which cooperate with the threads formed in aperture 17 and which is normally screwed into aperture 17 forming a closure therefor. Cup shaped plug 18 is provided with an annular flange 19. A cover plate 21 is attached to flange 19 by screws 22 which engage flange 19 through threaded holes 23. Intermediate between flange 19 and cover plate 21 is placed a gasket 20, which gasket 20 is compressed by tightening screws 22, thereby sealing the top of cup shaped plug 18. A substantially vertically extending guide tube 16 is welded or otherwise secured to plug 17, which guide tube 16 extends through the bottom of plug 17 in registry with a hole formed therein. Guide tube 16 is so positioned with respect to its length that a relatively short length 36 of guide tube 16 extends upwards into the interior of plug 18, and a substantially greater length 37 depends downwards into the interior of tank 10.

A symmetrical right cylindrical bell float 12, having an open bottom 13 and a closed top 14 is movable within tank 10, and, as hereinafter will be more fully described, is so arranged that it will exert an upward buoyancy induced force when liquid 11 reaches and exceeds a predetermined level, but will exert a downwards gravity induced force when said liquid 11 recedes below a predetermined level and no longer supports it. Securely connected to the center of top 14 of bell float 12 by welding or other means is push rod 15, which extends upwards through guide tube 16 into the interior of plug 18. Push rod 15 is connected to a rocker arm 31 by a pivotal joint 35 which is so constructed as to permit the push rod 15 to reciprocate in a vertical direction, but limiting its rotational motion in a plane normal to its longitudinal axis at the junction point. Joint 35 is so located on rocker arm 31 that the path of movement of the portion of push rod 15 extending upwards from the upper end of the guide tube 36 to its point of attachment to rocker arm 31 falls within an area defined by a projection of the internal cross section of guide tube 16. Such confinement to the above defined area of movement may be facilitated by the provision of a joint which permits some relative movement of the push rod 15 in a direction parallel to the longitudinal axis of rocker arm 31, although limiting any rotational motion of the push rod 15 with respect to the rocker arm 31 at this junction. Such a joint may be constructed as illustrated by forming a hook in the upper portion of push rod 15 which is hooked through an aperture formed in rocker arm 31, said hole being of greater diameter than push rod 15 but of smaller diameter than the diameter of guide tube 16 and the center of said hole being located on push rod 15 so that its center when rocker arm 31 is horizontal, is on a line that extends vertically from the center of guide tube 16. The other end of rocker arm 31 is pivotally mounted on a post 33 secured to the interior bottom of plug 18 by its foot 34 by welding or other means. Pivot joint 32 between rocker arm 31 and post 33 is so constructed as to permit rocker arm to reciprocate vertically in the plane in which push rod 15 moves, but to limit and restrict its motion in any other mode and in particular, to limit any rotational motion in the horizontal plane.

Slidably mounted on rocket arm 31 by means of clip 30 which firmly grips it is a positionally sensitive two electrode mercury switch 29. Mercury switch 29 is so constructed and arranged that contact is made between its electrodes when rocker arm 31 drops below the horizontal and contact is opened when the rocker arm 31 is raised above the horizontal. Such mercury switches are well known devices characterized by a pool of mercury enclosed in a hermetically sealed cylindrical chamber which is caused to bridge two internal electrodes sealed through and connected externally to wire leads 28 by which electric current is conducted to the mercury switch. Such a switch is actuated by tilting its enclosure to the angle necessary to cause the mercury pool to engulf or part from its internal electrodes. Such a switch is preferred for utilization in this invention as it has a low and stable resistance, has low torque requirements, is capable of operating with tilt angles of very small size, and is hermetically sealed so that it may be operated in the presence of flammable vapors without hazard. Mercury switch 29 may be moved back and forth along the length of rocker arm 31 while gripped by clip 30 to a point where the weight of the mercury contained therein supplies a desirable bias to the mechanical operation of the system.

Extending from mercury switch 29 are lead wires 28 which pass through a threaded aperture 25 in the side wall of plug 18 contained within an electrical conduit 26 securely fitted into a threaded adapter fitting 24 screwed into aperture 25. Conduit 26 at its inner end which extends into the interior of plug 17, is packed tightly with a packing material 27, thereby sealing it against the escape of any vapor from the interior of tank 10. This packing 27 may be of any number of well-known materials such as either synthetic or natural plastics. The seal effected by packing 27, in combination with cover plate 21 and its cooperating gasket 20 and flange 19 combine to form a vapor light assembly fully adapted for use where flammable liquids such as domestic fuel oil are contained in tank 10.

Referring now to FIGURE 4, a source of electric current 101 has one pole connected to a pole of mercury switch 29 and its other pole connected to a pole of alarm means 103. The second pole of alarm means 103 is connected to the second pole of mercury switch 29. As can be readily seen, the alarm means 103 is activated or deactivated as mercury switch 29 is either opened or closed. Electrical source 101 may supply electric power of various types and voltages. It can be a low voltage direct current source such as batteries, or it may be a relatively high voltage alternating current source such as common 110 volt A.C. household power, as mercury switches are versatile in their switching capabilities. The alarm means 103 may be an audio means such as an electric bell or buzzer, it can be a visual alarm such as an electric light, or it may be a combination of both, subject to the limitation that it must be suited for use with electric power of the type and voltage supplied by electrical source 101.

For the proper operation of the above-described system, it must be constructed in accordance with specific design parameters hereinafter set forth. Push rod 15 must be made of a mechanical spring material and should preferably be circular in cross section. Although a metallic non-corrosive spring material is preferred, there are other metallic spring materials, as well as non-metallic spring materials, which may be used. Suitable materials and their properties are well known to those skilled in the art. In contrast, guide tube 16 is constructed of a rigid material having a structural capability of relatively low deflection under the loading imposed on it. Tube 16 should preferably be cylindrical with a circular cross section. Suitable materials for this purpose are likewise numerous and well known. The inside diameter of tube 16 must be somewhat larger than the diameter of push rod 15 so as to allow push rod 15 to move easily within it, but it must not be so much greater that it fails to support push rod 15 and permits it to buckle excessively under its compression load so as to bind fixedly against the interior of guide tube 16 or to shorten its length so that its stroke will not actuate switch 29. It has been found preferable, in practice, to construct the apparatus of this invention with a guide tube 16 of one half inch or less inside diameter and with a push rod of one quarter inch or less outside diameter, and a construction wherein the interior diameter of the guide tube is approximately four times the diameter of the push rod has been found to be most satisfactory. The relative lengths of the push rod 15 and guide tube 16 must be such as to limit their relative motion to that differential travel only slightly in excess of the distance required to tilt mercury switch 29 up to the open position from its downward closed position. This is a quite small stroke since mercury switches, as hereinbefore noted, require a small tilt angle to operate. While this length of the stroke will depend on the geometry of the rocker arm 31 and the pivot joints 32 and 35 arranged thereon, in practice the length of the stroke employed will be a fraction of an inch. In addition, guide tube 16 is so positioned and arranged with respect to the bottom of plug 18 that its dependent portion 37 is of such a length as to limit the upwards motion of push rod 15 by having the upper closed end 14 of float 12 bear against it after said float is lifted by fluid 11 to the point required to inactuate switch 29 so as to absorb the buoyant force engendered that might otherwise jam the mechanism of this apparatus and to firmly position float 12 while it is acted upon by the force of buoyancy. Guide tube 16 is also positioned and arranged so as to have the extending portion 36 of push rod 15 of such a length that it will serve to limit the downward motion of push rod 15 by having the lower portion of rocker arm 31 bear against its upper edge when the rocker arm 31 is in its lowest position, so as to absorb a major portion of the gravitational load produced when float 12 is not supported by fluid 11. It is also required that the upper end of push rod 15 be restrained against rotation and pivot joints 32 and 35 must be designed accordingly. In contrast, the other end of push rod 15 and float 12 attached thereto should be free to move laterally. It is further required that float 12 be an open ended bell float as a float of this type has marked positional stability due to the equalization of hydrostatic pressure on its interior and exterior surfaces, which stability increases as the pressure increases. This stabilizing effect is of great value to the efficient operation of the invention and for that reason, the bell float 12 is constructed so as to have a vertical dimension in excess of its horizontal dimension or dimensions to enhance its stability. A float configuration wherein the cylindrical float has a height of approximately two to three times its internal diameter has given excellent results. It is preferred to construct bell float 12 in the form of a right cylindrical bell float with a height greater than its internal diameter.

In operation, float 12 will rise and fall in response to changes in the level of the fluid contained in tank 10. As long as the level of fluid 11 remains at or above a predetermined level, push rod 15 will be pushed upward by the buoyancy of float 12 to the limit of its travel in guide tube 16 thereby maintaining rocker arm 31 in its upward position and thus maintaining mercury switch 29 mounted thereon in the open position. When the liquid 11 drops below the predetermined level, float 12 will no longer be supported by fluid 11 and its dependent weight, together with the weight of push rod 16, will cause the rocker arm to fall to its lower position thereby tilting mercury switch 29 mounted thereon to its closed position. When switch 29 is closed, current flows from electric source 101 through switch 29 to activate alarm means 103. As the supply of liquid 11 is replenished, it rises to a level where it will commence to support the weight of float 12 and its associated components. As the level of fluid 11 further rises, it will cause float 12 to rise further, thereby lifting push rod 15 and thus moving rocker 31 to its upper position so that mercury switch 30 borne thereon is restored to its normally open position. The opening of switch 30 breaks the electric circuit and alarm means 103 is therefore deactivated.

During the operative cycle previously described a vital dynamic function takes place. As hereinbefore stated, push rod 15 is constructed of a mechanical spring material and its upper end is restrained from rotation while its lower end and the float 12 attached thereto are free to rotate. As push rod 15 is loaded by the buoyancy induced force generated by float 12 when liquid 11 rises above a predetermined level, a torsional force is produced which causes push rod 15 to twist or rotate at its free end, thereby producing rotation to a declining degree through the length of push rod 15 to the restrained end thereof. When the liquid level declines to a point that the buoyancy induced load is no longer borne by push rod 15, it returns to its normal form, as the load is removed, by rotating in the opposite direction. As might be deduced from the nature of the material from which push rod 15 is constructed, push rod 15 would distort and buckle appreciably while under load were it not confined and supported by guide tube 16. The substantially coextensive guide tube prevents this undesirable effect, but its confining function results in the impingement of push rod 15 against the interior of guide tube 16 at one or more points of contact. Such impingement would produce frictional forces and consequent binding of push rod 15 within guide tube 16 that would seriously and adversely affect the utility of the apparatus were it not for the rotating and counter-rotating action of push rod 15. The rotation of push rod 15 produces a roller action that reduces the frictional engagement between push rod 15 and guide tube 16 to an acceptable minimum, thereby permitting push rod 15 to move freely and easily within guide tube 16 during its operative cycle. While the exact dynamics of this rotating action of push rod 15 have not been fully analyzed, it is believed that such rotation is caused by instability due to column action under load, as it is well known that an elastic column distorts slightly under loading to produce some eccentricity. It would therefore follow that the resultant load on push rod 15 is displaced from its axis by a small amount thereby applying a twisting couple to push rod 15 causing it to rotate. A relatively small amount of rotation of push rod 15 will effect the desired results. In practice, a rotation of push rod 15 through an angle between one third and one half of one radian in size measured at the point of attachment of said push rod to said float will produce excellent results. A larger amount of rotation, however, would not be harmful.

In addition to the foregoing, frictional resistance to the motion of push rod 15 within guide tube 16 is further minimized by guide tube 16 acting as a capillary tube when its lower end is submerged in liquid 11 causing the fluid 11 to rise in tube 16 to a level elevated above the level of the liquid 11 in the tank 10, so as to lubricate push rod 16 during its vertical movement and its rotational movement. Such lubrication may be accomplished either by fluid 11 filling tube 16 or by a residual film of fluid left adherent to the interior walls of tube 16 when the level of fluid 11 recedes therein.

While the present invention is described in a manner reflecting its use in connection with a tank containing a fluid and in particular, a tank containing fuel oil for domestic consumption, it is obvious that it may be used for other purposes. For example, it may be used with a boiler to signal a dangerous low water condition.

It will thus be apparent that the system of this invention is a thoroughly reliable indicator which will fail safe in operation and is so constructed as to be free from error signals resulting from excessive friction between its components or from deformation of its actuating means.

Furthermore, the system of the invention is simple and inexpensive to manufacture, eliminating the need for expensive sealed floats and for auxiliary structure to stabilize the motion of such a float.

One of the more specific advantages of the invention lies in its use in connection with a tank for domestic fuel oil consumption in that it will repeatedly and reliably indicate when the fuel oil within a tank drops below a predetermined level warning the home owner to order a supply of oil before his supply runs out from his supplier, thereby saving him the discomfort attendant with loss of heat until he is resupplied and saving his supplier undesirable distribution expenses attendant with emergency deliveries of fuel outside of regular working hours.

I claim:

1. In a system for indicating the level of a liquid in a tank wherein a float is subjected to buoyant force and which float is positively connected by mechanical means to means to vary an electric current to produce a signal responsive to the level of said liquid, a linear mechanical actuator comprising an open ended symmetrical bell float, a movable pushrod of circular cross section formed of a flexible mechanical spring material immovably attached to said float and having a degree of flexibility that the torsional force applied to said push rod under structural loading by the buoyant thrust of said float produces a rotation of said push rod through an angle of one-third to one half of one radian in size measured at the point of attachment of said float to said push rod, a substantially vertical fixed relatively cylindrical guide tube of a material substantially more rigid than said push rod enclosing said push rod for substantially the greater portion of its length, a rocker arm connected to said push rod by non-rotatable linkage means restraining said push rod from rotation at its point of attachment to said rocker arm, a uni-directional pivot on which said rocker arm is mounted confining the oscillating methods of said rocker arm to the plane of linear movement of said push rod, positionally sensitive means to vary an electric current mounted on said rocker arm, and a base plate through which guide tube downwardly depends and upwardly extends and upon which said pivot is mounted, said guide tube having a diameter sufficiently large to permit said push rod to move freely within said guide tube but not so relatively large as to fail to support said push rod against buckling and having a length relative to said push rod limiting their relative motion to a differential travel only slightly in excess of that required to actuate said means to vary an electric current, said downwardly dependent portion of said guide tube being of such length as to limit the upward motion of said float to the distance required to effect said relative motion and thereafter absorb the buoyant thrust of said float and said upwardly extending portion being of such length as to support said rocker arm in its lowest position.

2. In a system for indicating the level of liquid in a tank, the combination comprising a tank having sides, a bottom and a top, threaded aperture in said tank top, a threaded removable cup-shaped plug adapted to be screwed into said aperture with said cup extending in the direction of the interior of said tank, a relatively rigid cylindrical guide tube substantially vertically extending through said plug having one portion depending downwardly from said plug and its remaining portion projecting upwardly from said plug, an open-ended symmetrical bell float having a top portion larger in area than the diameter of said tube, a push rod of circular cross-section formed of a flexible mechanical spring material immovably attached to said float and having a degree of flexibility that the torsional force applied to said push rod under structural loading by the buoyant thrust of said float produces a rotation of said push rod through an angle of one-third to one half of one radian in size measured at the point of attachment of said float to said push rod, said push rod extending from said float through said guide tube and into said cup and being of sufficient length to permit said float to rise and fall in response to changes in the level of said fluid, a rocker arm, a uni-directional pivot joint connecting said push rod to said rocker arm restraining said push rod from rotation at its point of connection, a uni-directional pivot for said rocker arm mounted within said plug permitting said rocker arm to reciprocate in the plane in which said push rod moves but limiting its motion in any other mode, positionally responsive normally open electric switching means mounted on said rocker arm actuated by the rocking motion of said rocker arm, and a source of electricity connected to said switching means to electrically operate alarm means when motion of said rocker arm corresponding to the fall of said float closes said switching means as the surface of said liquid recedes to a predetermined level, said guide tube having a diameter sufficiently large to permit said push rod to move freely within said guide tube but not so relatively large as to fail to support said push rod against buckling and having a length relative to said push rod limiting their relative motion to a differential travel only slightly in excess of that required to actuate said switching means, and said guide tube having a downwardly dependent portion of such length as to limit the upward motion of said float to the distance required to effect said relative motion and thereafter absorb the buoyant thrust of said float and having an upwardly extending portion of such length as to support said rocker arm in its lowest position.

References Cited

UNITED STATES PATENTS

| | | |
|---|---|---|
| 1,769,173 | 7/1930 | Brannen. |
| 1,775,020 | 9/1930 | Davin _____ 200—84 |
| 2,625,042 | 1/1953 | Binford _____ 200—84.2 XR |

FOREIGN PATENTS 471,706  9/1937  Great Britain.

JOHN W. CALDWELL, Primary Examiner

D. K. MYER, Assistant Examiner

U.S. Cl. X.R.

73—321; 200—84